United States Patent [19]

Pons et al.

[11] Patent Number: 5,558,425
[45] Date of Patent: Sep. 24, 1996

[54] FLUORESCENT TUBE CABIN LIGHTING

[75] Inventors: Sylvain Pons; Daniel Segaud, both of Paris, France

[73] Assignee: Valeo Electronique, Creteil, France

[21] Appl. No.: 336,522

[22] Filed: Nov. 9, 1994

[30] Foreign Application Priority Data

Nov. 9, 1993 [FR] France ................... 93 13358

[51] Int. Cl.$^6$ ....................... B60Q 3/02
[52] U.S. Cl. ............. 362/74; 362/80; 362/220; 362/224; 362/285; 362/300; 362/302; 362/427
[58] Field of Search ............ 362/74, 151, 152, 362/217, 220, 223, 224, 225, 260, 299, 300, 427, 61, 80, 302, 285, 287

[56] References Cited

U.S. PATENT DOCUMENTS

| | | | |
|---|---|---|---|
| 1,232,037 | 7/1917 | Jaminet | 362/74 |
| 2,090,542 | 8/1937 | Mayer et al. | 362/237 |
| 2,740,885 | 4/1956 | Kruger | 362/220 |
| 4,112,483 | 9/1978 | Small, Jr. et al. | 362/217 |
| 4,157,584 | 6/1979 | Bhatt | 362/74 |
| 4,282,564 | 8/1981 | McJunkin, Jr. et al. | 362/223 |
| 4,338,653 | 7/1982 | Marrero | 362/223 |

FOREIGN PATENT DOCUMENTS

| | | | |
|---|---|---|---|
| 1362105 | 4/1964 | France | 362/74 |
| 0634976 | 3/1950 | United Kingdom | 362/217 |

*Primary Examiner*—Denise L. Gromada
*Assistant Examiner*—Alan B. Cariaso
*Attorney, Agent, or Firm*—McCormick, Paulding & Huber

[57] ABSTRACT

The present invention relates to a lighting device for lighting the cabin of a motor vehicle, the device comprising an elongate light source disposed inside a housing. According to the invention, the lighting device further comprises: two windows transparent to the light flux emitted by the source, the windows being spaced apart from each other and comprising a top window through which light radiation is emitted in a generally horizontal direction, and a bottom window through which light radiation is emitted generally downwards; a first directional light reflector disposed between two respective first edges of the windows; and a second directional light reflector disposed between the two respective other edges of the windows; the directional light reflectors having shapes that combine to guide the light flux emitted by the source towards the transparent windows.

31 Claims, 4 Drawing Sheets

FIG_1

FIG_2

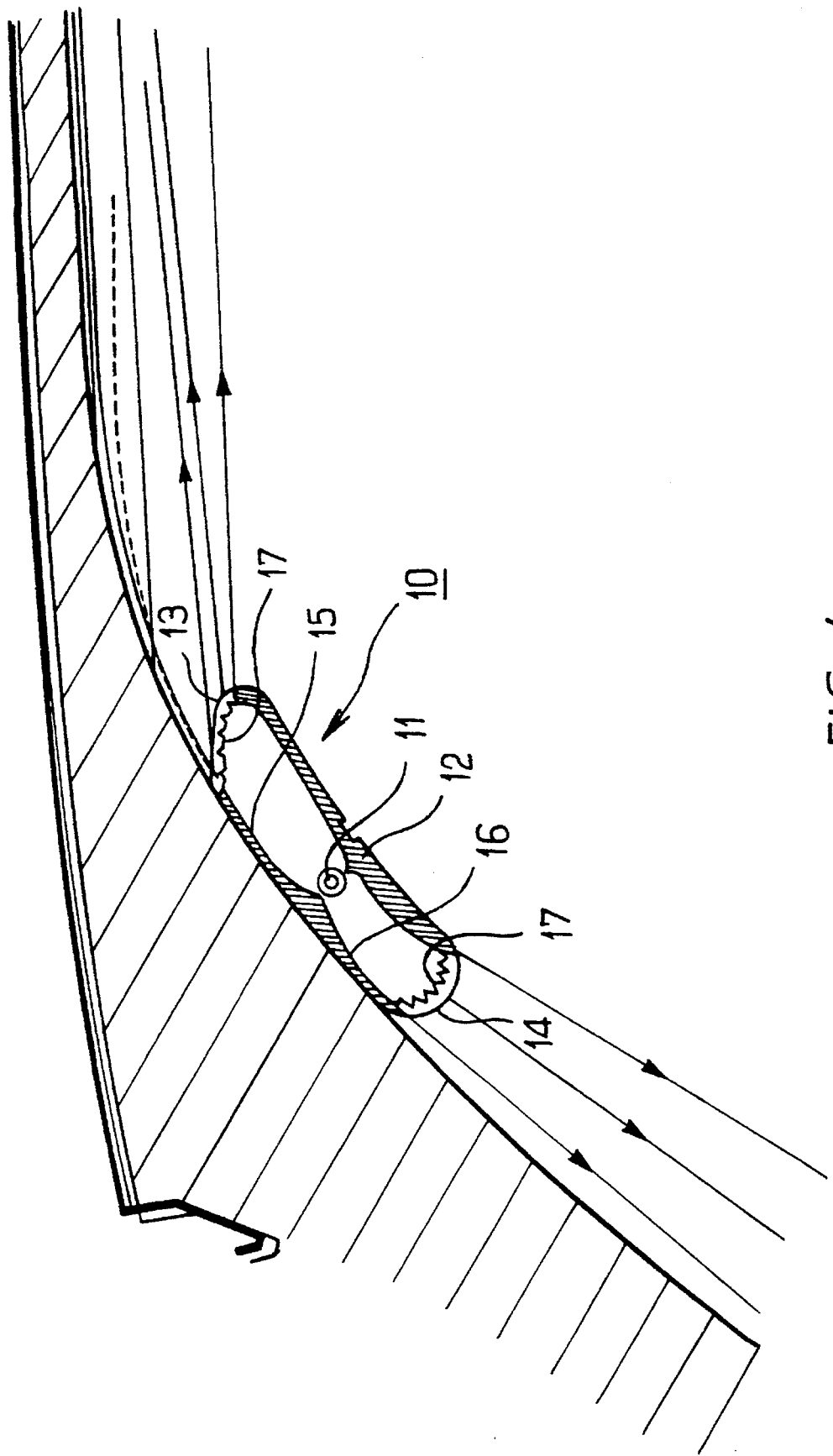
FIG_4

FLUORESCENT TUBE CABIN LIGHTING

The present invention relates to a novel device for lighting the cabin of a motor vehicle.

BACKGROUND OF THE INVENTION

At present, in the state of the art, there exists a cabin lighting device used in particular as a ceiling light or as a courtesy light and that comprises a light source disposed inside a housing that includes a transparent window through which the light source emits a beam of light into the cabin.

The main drawback of such a device is that in order to provide proper lighting of the inside of the cabin, the device emits a light beam towards the passengers and dazzles them.

OBJECT AND SUMMARY OF THE INVENTION

The invention seeks to provide a novel device for lighting the cabin of a motor vehicle, the device comprising an elongate light source disposed inside a housing, and enabling interior lighting of the cabin to be obtained by projecting a beam of light towards the ceiling and towards the space in which passengers are active, but without dazzling them.

More particularly, according to the invention, the housing of the lighting device comprises:

two windows transparent to the light flux emitted by the source, the windows being spaced apart from each other and comprising a top window through which light radiation is emitted in a generally horizontal direction, and a bottom window through which light radiation is emitted generally downwards;

first directional light flux recovery means disposed between two respective first edges of said windows; and second directional light flux recovery means disposed between the two respective other edges of said windows;

said directional light flux recovery means having shapes that combine to guide the light flux emitted by the source towards said transparent windows.

In a particularly advantageous embodiment of the invention, the elongate light source is a fluorescent tube.

BRIEF DESCRIPTION OF THE DRAWINGS

The following description made with reference to the accompanying drawings given as non-limiting examples shows clearly what the invention consists of and how it may be implemented.

FIG. 4 is a cross-section view of a variant of the FIG. 3 embodiment of the device.

As a preliminary point, it should be observed that portions that are identical or similar from one figure to another are given the same reference symbols and are not described each time.

MORE DETAILED DESCRIPTION

Figure 1:
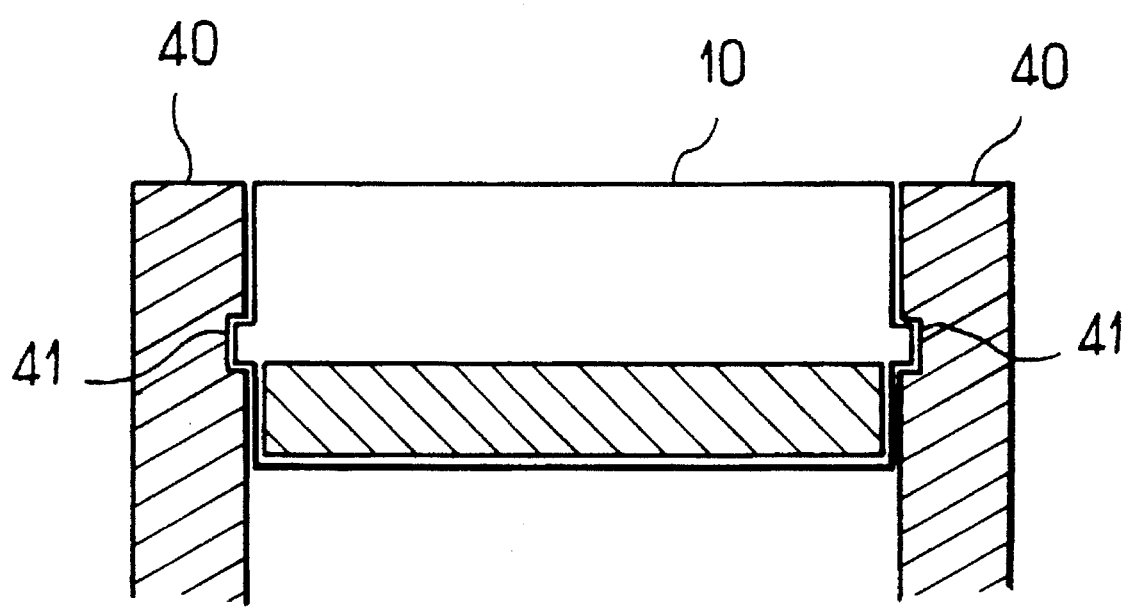
FIG. 1 is a diagrammatic side view of an embodiment of the lighting device of the invention.
Figure 2:
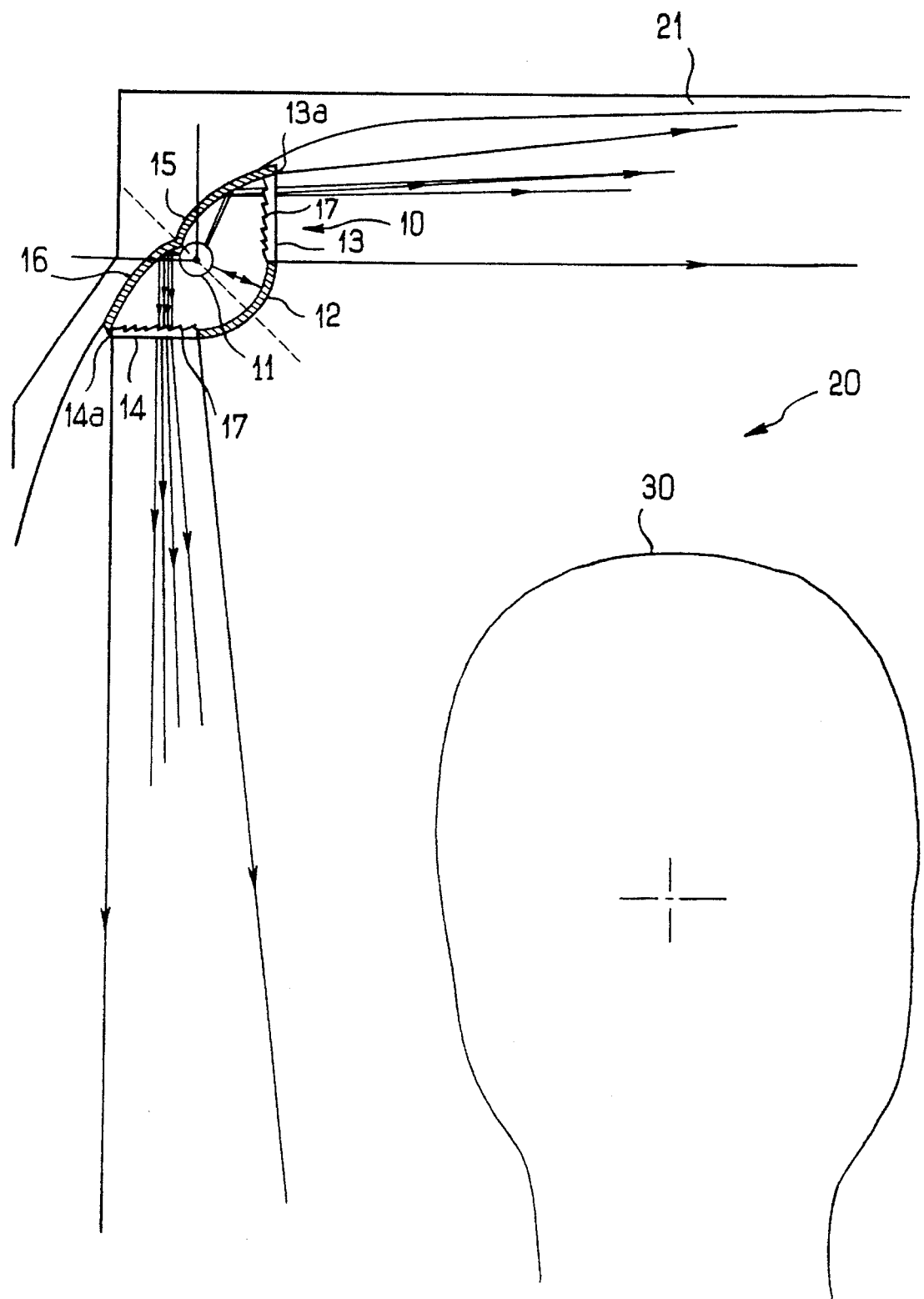
FIG. 2 is a cross-section view of the lighting device of FIG. 1.

FIGS. 1 and 2 show an embodiment of a lighting device for lighting a motor vehicle cabin 20, the device comprising a fluorescent tube 11 disposed inside a housing 10. The housing 10 is pivotally mounted in bearings 41 of a support 40 designed to be mounted on a portion of the vehicle.

The housing 10 includes first directional light flux recovery means 12 disposed between the fluorescent tube 11 and the "activity space" of the cabin 20 in which passengers 30 are to be found. In this case, the first light flux recover means 12 is constituted by a segmented cylindrical mirror facing the fluorescent tube 11 and generally coaxial with said tube, masking it in part. In addition, the housing 10 has two windows 13 and 14 that are transparent to the light flux, namely a top window 13 and a bottom window 14 that are spaced apart from each other on opposite sides of the first light flux recovery means 12. Each of the windows 13 and 14 extends from one of the edges of the first light flux recovery means 12, and the two windows extend substantially perpendicularly relative to each other. As can be seen in FIG. 2, the transparent windows 13 and 14 include regularly spaced-apart stripes 17 on their inside surfaces facing towards the fluorescent tube 11. These stripes 17 serve to process the light flux passing through the windows, in particular by altering the direction thereof. The stripes promote optimization of lighting inside the cabin. It should be observed that in other embodiments (not shown) the stripes could be replaced by other light-processing means such as prisms, striped prisms, toruses, or beads.

The housing 10 also includes second light flux recovery means comprising two associated reflectors 15 and 16. In the embodiment shown, each of these two reflectors 15 and 16 is parabolic and extends parallel to the axis of the segmented cylindrical reflector. The focal line of the parabolic reflector is close to the light source, and together the reflectors extend between two respective edges 13a and 14a of the transparent windows 13 and 14 so as to face the first light flux recovery means 12. The two reflectors 15 and 16 are connected to each other along an edge in a central portion that is close to the fluorescent tube 11.

In operation, the first directional light flux recovery means 12 is designed to reflect back into the housing 10, the light flux that is emitted by the fluorescent tube 11 towards passengers 30 occupying the activity space of the cabin 20. The reflectors 15 and 16 are suitable for reflecting the light flux emitted by the fluorescent tube 11 and also the light flux reflected by the first flux recovery means 12 so as to direct the light towards the transparent windows 13 and 14. On passing through said windows 13 and 14, the light flux is modified by the stripes disposed on the inside surfaces of said windows. Thus, said device serves to form two light beams propagating in two essentially perpendicular directions. A first beam is emitted in an essentially horizontal direction towards the ceiling 21 of the cabin 20. A second beam is directed essentially vertically into the activity space of the cabin 20 without dazzling the passengers 30.

Figure 3:
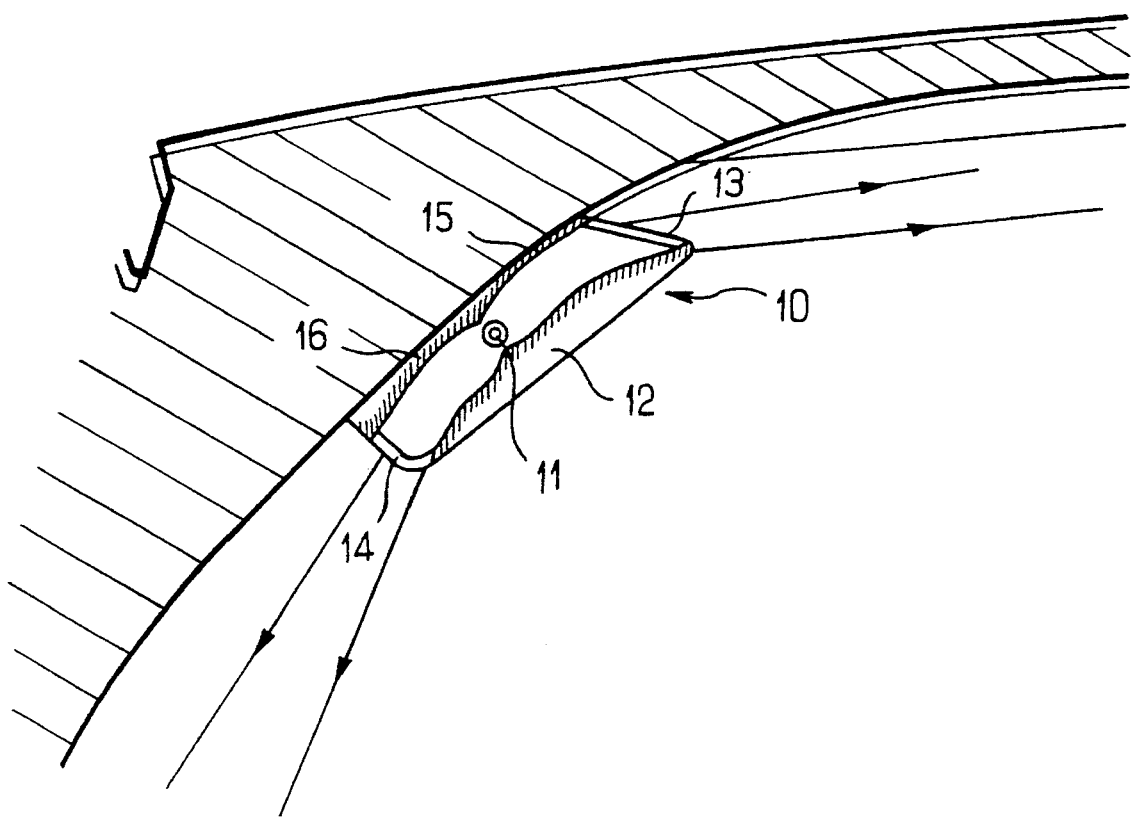
FIG. 3 is a cross-section view of another embodiment of the lighting device of the invention.

FIG. 3 shows another embodiment of the lighting device in which the first and second directional light flux recovery means 12, 15, and 16 of the housing comprise cylindrical reflecting surfaces having profiles determined by computation using a computer. The reflecting surfaces of said recovery means combine so as to direct the light flux emitted by the fluorescent tube 11 towards the top and bottom transparent windows 13 and 14 which are disposed substantially parallel to each other in this case. In this typical case, the transparent windows 13 and 14 through which the light flux is emitted have inside and outside faces that are smooth or slightly diffusing.

The light radiation emitted through the top window 13 is directed substantially horizontally while the light radiation emitted through the bottom window 14 propagates in an essentially vertical downward direction.

In a variant embodiment shown in FIG. 4, the transparent windows 13 and 14 include regularly spaced apart stripes 17 on their inside surfaces facing the fluorescent tube 11. Here again, it should be observed that in other embodiments, not shown, the stripes could be placed on the outside faces of the windows, and they could be replaced by other light-processing means such as prisms, toruses, or beads.

Naturally, the present invention is not limited in any way to the embodiments shown and described, and the person skilled in the art will be able to apply variations thereto within the spirit of the invention.

We claim:

1. A lighting device for lighting the cabin of a motor vehicle, the device comprising an elongate light source disposed inside a housing, wherein the housing comprises:
    two windows transparent to the light flux emitted by the source, the windows being spaced apart from each other and comprising a top window through which light radiation is emitted in a generally horizontally direction, and a bottom window through which light radiation is emitted generally downwards;
    first directional light flux recovery means disposed between two respective first edges of said windows; and
    second directional light flux recovery means disposed between the two respective other edges of said windows;
    said directional light flux recovery means having shapes that combine to guide the light flux emitted by the source towards said transparent windows; and
    a support fixed to a portion of the vehicle for pivotally supporting said housing.

2. A lighting device according to claim 1, wherein the first directional flux recovery means is disposed between the light source and an activity region of the cabin in which passengers are to be found, and is suitable for reflecting the light flux emitted by the light flux towards the passengers back into the housing, and wherein the second directional flux recovery means is disposed opposite the first directional flux recovery means and is suitable for reflecting both the light flux emitted by the source and the flux reflected by the first flux recovery means to direct said flux towards the transparent windows.

3. A lighting device according to claim 1, wherein the first and second directional light flux recovery means comprise cylindrical reflecting surfaces having profiles determined by computation.

4. A lighting device according to claim 1, wherein the second directional flux recovery means comprises two reflectors that meet along one of their respective edges in a central region close to the light source.

5. A lighting device according to claim 1, wherein the two transparent windows extend in essentially transverse directions relative to each other.

6. A lighting device according to claim 1, wherein the two transparent windows extend essentially parallel to each other.

7. A lighting device according to claim 1, wherein each window includes treatment means for treating the light flux passing through said windows.

8. A lighting device according to claim 7, wherein the light flux treatment means are positioned on inside portions of the windows facing the light source.

9. A lighting device according to claim 7, wherein the treatment means are stripes distributed over the inside surfaces of the windows.

10. A lighting device according to claim 1, wherein the first directional flux recovery means includes a segmented cylindrical mirror the axis of which is coincident with said elongated light source.

11. A lighting device according to claim 1, wherein the second directional flux recovery means comprises parabolic reflectors of elongated configuration and arranged parallel said light source and whose focal lines are close to the light source.

12. A lighting device for lighting the cabin of a motor vehicle, the device comprising an elongate light source disposed inside a housing, wherein the housing comprises:
    two windows transparent to the light flux emitted by the source, the windows being spaced apart from each other and comprising a top window through which light radiation is emitted in a generally horizontally direction, and a bottom window through which light radiation is emitted generally downwards;
    first directional light flux recovery means disposed between two respective first edges of said windows; and
    second directional light flux recovery means disposed between the two respective other edges of said windows;
    said directional light flux recovery means having shapes that combine to guide the light flux emitted by the source towards said transparent windows; and
    said second directional flux recovery means including parabolic reflectors of elongated configuration parallel said light source, and having focal lines close to said elongated light source.

13. A lighting device according to claim 12, wherein the first directional flux recovery means is disposed between the light source and an activity region of the cabin in which passengers are to be found, and is suitable for reflecting the light flux emitted by the light flux towards the passengers back into the housing, and wherein the second directional flux recovery means is disposed opposite the first directional flux recovery means and is suitable for reflecting both the light flux emitted by the source and the flux reflected by the first flux recovery means to direct said flux towards the transparent windows.

14. A lighting device according to claim 12, wherein the first and second directional light flux recovery means comprise cylindrical reflecting surfaces having profiles determined by computation.

15. A lighting device according to claim 12, wherein the second directional flux recovery means comprises two reflectors that meet along one of their respective edges in a central region close to the light source.

16. A lighting device according to claim 12, wherein the two transparent windows extend in essentially transverse directions relative to each other.

17. A lighting device according to claim 12, wherein the two transparent windows extend essentially parallel to each other.

18. A lighting device according to claim 12, wherein each window includes treatment means for treating the light flux passing through said windows.

19. A lighting device according to claim 12, wherein the light flux treatment means are positioned on inside portions of the windows facing the light source.

20. A lighting device according to claim 12, wherein the treatment means are stripes distributed over the inside surfaces of the windows.

21. A lighting device according to claim 12, including a support fixed to a portion of the vehicle and on which the housing is pivotally mounted.

22. A lighting device for lighting the cabin of a motor vehicle, the device comprising an elongate light source disposed inside a housing, wherein the housing comprises:

- two windows transparent to the light flux emitted by the source, the windows being spaced apart from each other and comprising a top window through which light radiation is emitted in a generally horizontally direction, and a bottom window through which light radiation is emitted generally downwards;

- first directional light flux recovery means disposed between two respective first edges of said windows; and

- second directional light flux recovery means disposed between the two respective other edges of said windows;

- said directional light flux recovery means having shapes that combine to guide the light flux emitted by the source towards said transparent windows; and

- said first directional flux recovery means including a segmented cylindrical mirror the axis of which segmented cylindrical mirror is coincident with said elongated light source, and wherein second directional flux recovery means includes elongated parabolic reflectors arranged parallel said elongated light source and such that their focal lines are close to said elongated light source.

23. A lighting device according to claim 22, wherein the first directional flux recovery means is disposed between the light source and an activity region of the cabin in which passengers are to be found, and is suitable for reflecting the light flux emitted by the light flux towards the passengers back into the housing, and wherein the second directional flux recovery means is disposed opposite the first directional flux recovery means and is suitable for reflecting both the light flux emitted by the source and the flux reflected by the first flux recovery means to direct said flux towards the transparent windows.

24. A lighting device according to claim 22, wherein the first and second directional light flux recovery means comprise cylindrical reflecting surfaces having profiles determined by computation.

25. A lighting device according to claim 22, wherein the second directional flux recovery means comprises two reflectors that meet along one of their respective edges in a central region close to the light source.

26. A lighting device according to claim 22, wherein the two transparent windows extend in essentially transverse directions relative to each other.

27. A lighting device according to claim 22, wherein the two transparent windows extend essentially parallel to each other.

28. A lighting device according to claim 22, wherein each window includes treatment means for treating the light flux passing through said windows.

29. A lighting device according to claim 22, wherein the light flux treatment means are positioned on inside portions of the windows facing the light source.

30. A lighting device according to claim 22, wherein the treatment means are stripes distributed over the inside surfaces of the windows.

31. A lighting device according to claim 22, including a support fixed to a portion of the vehicle and on which the housing is pivotally mounted.

* * * * *